US010318328B2

(12) United States Patent
Lee et al.

(10) Patent No.: US 10,318,328 B2
(45) Date of Patent: Jun. 11, 2019

(54) METHOD FOR MANAGING OPERATING SYSTEM AND ELECTRONIC DEVICE SUPPORTING THE SAME

(71) Applicant: Samsung Electronics Co., Ltd., Gyeonggi-do (KR)

(72) Inventors: Je Won Lee, Gyeonggi-do (KR); Young Kyoo Kim, Seoul (KR); Sung Jo Oh, Gyeonggi-do (KR); Sun Kee Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 155 days.

(21) Appl. No.: 15/220,804

(22) Filed: Jul. 27, 2016

(65) Prior Publication Data

US 2017/0031697 A1    Feb. 2, 2017

(30) Foreign Application Priority Data

Jul. 27, 2015    (KR) .................... 10-2015-0106131

(51) Int. Cl.
*G06F 9/455*    (2018.01)
*G06F 9/46*    (2006.01)
(Continued)

(52) U.S. Cl.
CPC .......... *G06F 9/45558* (2013.01); *G06F 3/048* (2013.01); *G06F 3/0481* (2013.01);
(Continued)

(58) Field of Classification Search
CPC .... G06F 3/048; G06F 3/0481; G06F 3/04812; G06F 3/04817; G06F 9/451; G06F 9/453;
(Continued)

(56) References Cited

U.S. PATENT DOCUMENTS

2006/0136912 A1* 6/2006 Robinson ................ G06F 21/53
                                                                    718/1
2010/0281481 A1* 11/2010 Rainisto ................ G06F 3/0481
                                                                    718/100
(Continued)

FOREIGN PATENT DOCUMENTS

KR    10-2012-0071275 A    7/2012
KR    10-2013-0061009 A    6/2013

*Primary Examiner* — Charles M Swift
(74) *Attorney, Agent, or Firm* — Cha & Reiter, LLC

(57) ABSTRACT

A method for managing operating system executed by an electronic device is provided. The method includes obtaining, by a guest module of the guest operating system, information regarding a guest app executable on the guest operating system, providing, by the guest module, the information regarding the guest app to a host module of the host operating system, providing, by the host module, the information regarding the guest app to an app list creation module of the host operating system, combining, by the app list creation module, information regarding a host app executable on the host operating system and the information regarding the guest app, and outputting, by the app list creation module, an app execution list that includes the combined information.

18 Claims, 14 Drawing Sheets

(51) Int. Cl.
*G06F 3/0481* (2013.01)
*G06F 3/0482* (2013.01)
*G06F 9/48* (2006.01)
*G06F 3/048* (2013.01)
*G06F 9/451* (2018.01)
*G06F 9/50* (2006.01)

(52) U.S. Cl.
CPC ........ *G06F 3/0482* (2013.01); *G06F 3/04812* (2013.01); *G06F 3/04817* (2013.01); *G06F 9/451* (2018.02); *G06F 9/453* (2018.02); *G06F 9/455* (2013.01); *G06F 9/45545* (2013.01); *G06F 9/48* (2013.01); *G06F 9/4843* (2013.01); *G06F 9/4881* (2013.01); *G06F 9/50* (2013.01); *G06F 2009/45575* (2013.01); *G06F 2009/45579* (2013.01)

(58) Field of Classification Search
CPC .... G06F 9/455; G06F 9/4555; G06F 9/45558; G06F 9/48; G06F 9/4843; G06F 9/4881; G06F 9/50
See application file for complete search history.

(56) References Cited

U.S. PATENT DOCUMENTS

| | | | |
|---|---|---|---|
| 2011/0154328 A1* | 6/2011 | Mo | G06F 9/45541 718/1 |
| 2012/0180049 A1* | 7/2012 | Tsai | G06F 9/45558 718/1 |
| 2012/0203890 A1* | 8/2012 | Reynolds | G06F 11/3495 709/224 |
| 2013/0139075 A1 | 5/2013 | Park | |
| 2013/0290858 A1* | 10/2013 | Beveridge | G06F 3/0484 715/740 |
| 2014/0007106 A1* | 1/2014 | Weksler | G06F 9/485 718/100 |
| 2014/0191994 A1* | 7/2014 | Chung | G06F 3/0488 345/173 |
| 2015/0012837 A1* | 1/2015 | Momchilov | G06F 3/1454 715/744 |
| 2015/0032889 A1 | 1/2015 | Chan et al. | |
| 2015/0067683 A1* | 3/2015 | Robinson | G06F 21/53 718/1 |

* cited by examiner

METHOD FOR MANAGING OPERATING SYSTEM AND ELECTRONIC DEVICE SUPPORTING THE SAME

CLAIM OF PRIORITY

This application claims the benefit under 35 U.S.C. § 119(a) of a Korean patent application filed on Jul. 27, 2015 in the Korean Intellectual Property Office and assigned Serial number 10-2015-0106131, the entire disclosure of which is hereby incorporated by reference.

TECHNICAL FIELD

The present disclosure to a method for managing a plurality of operating systems of an electronic device and an electronic device supporting the same.

BACKGROUND

An electronic device such as a smart phone, a tablet, or the like may perform various functions by using an application (hereinafter referred to as "app"). Hardware specifications and optimization performance have been improving as technology associated with these electronic devices is being developed. For example, increasingly these electronic devices have been able to run a plurality of operating systems.

Bring your own device (BYOD) is an increasing trend, in particular in business communities, and refers to the policy of permitting users (e.g. employees) to bring personally owned mobile devices (e.g., laptops, tablets, and smart phones) for use in the employer's network environment so that the employee's personal devices can access confidential company information and applications. For this reason, technology is being developed for using these electronic devices as virtual machines (VM) so that the electronic devices can access the employer's data in a secure manner. The VM may support a second operating system on the electronic device so that the user can access confidential data only when the electronic device is running the second operating system. Accordingly, software on the electronic device may be segregated into business and personal areas.

A conventional hypervisor system, also known as a virtual machine manager, is used to efficiently distribute resources on devices running virtual machines. In the case where a plurality of operating systems operate at the same time, the operating systems are driven independently of each other. However, in the case where the user wants to manage apps running on the different operating systems, the user may have to log into each operating system separately to manage the apps running on each operating system, which may be inconvenient to the user.

SUMMARY

Aspects of the present disclosure are to address at least the above-mentioned problems and/or disadvantages and to provide at least the advantages described below. Accordingly, an aspect of the present disclosure is to provide a method for managing operating system that jointly displays and manages a list of apps executable on a plurality of operating systems to a user and an electronic device supporting the same.

In accordance with an aspect of the present disclosure, there is provided a method for managing operating system executed by an electronic device. The method includes obtaining, by a guest module of the guest operating system, information regarding a guest app executable on the guest operating system, providing, by the guest module, the information regarding the guest app to a host module of the host operating system, providing, by the host module, the information regarding the guest app to an app list creation module of the host operating system, combining, by the app list creation module, information regarding a host app executable on the host operating system and the information regarding the guest app, and outputting, by the app list creation module, an app execution list that includes the combined information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
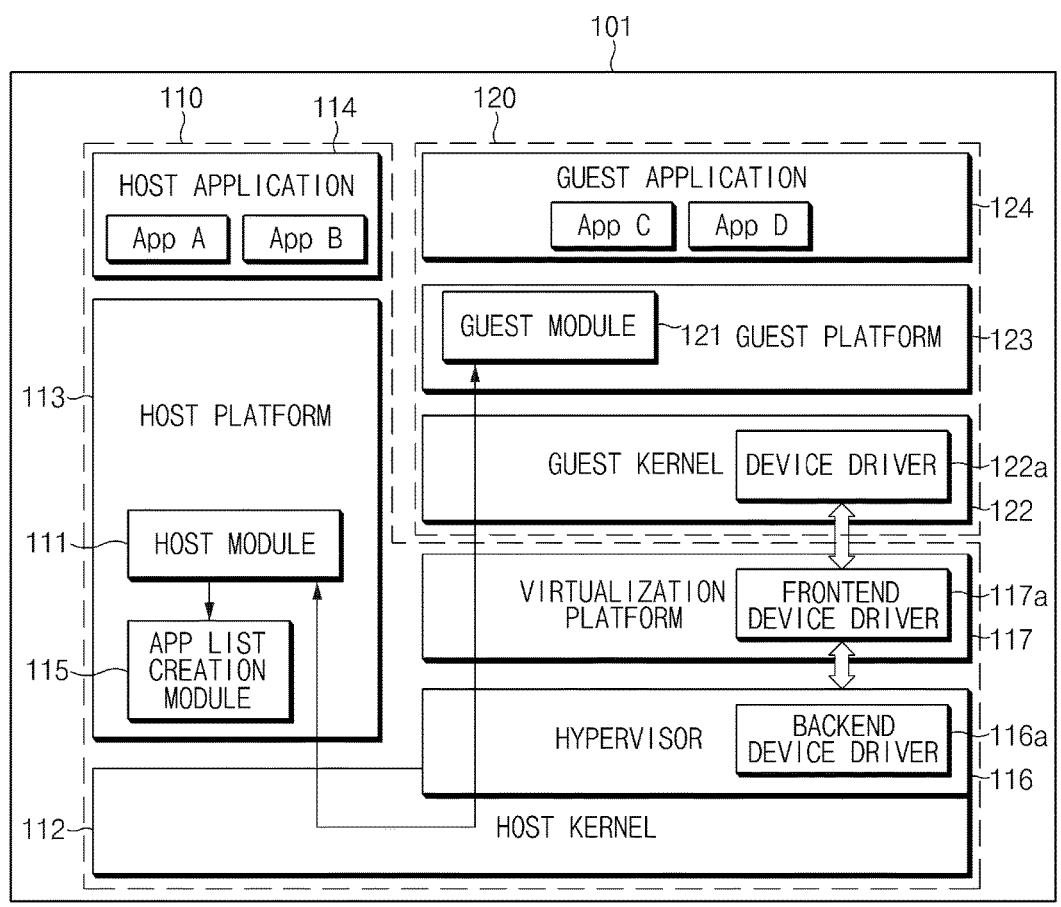
FIG. 1A illustrates a block diagram of an electronic device according to one embodiment of the present disclosure.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1A illustrates a configuration diagram of an electronic device according to one embodiment of the present disclosure.

Referring to FIG. 1A, an electronic device 101 may run a plurality of operating systems by using a hypervisor, also called a virtual machine manager in the art. Like server virtualization, the hypervisor may operate two separate operating systems on the electronic device 101 so that, even though the electronic device 101 is a single physical device, the electronic device 101 can appear to be two distinct terminals, depending on which operating system is currently running.

The hypervisor may be installed between the hardware (kernel) and the plurality of operating systems (Type-1) or on a host operating system such that the operating systems are driven independently of each other (Type-2).

According to one embodiment, in the case where type-2 scheme is applied to the electronic device 101, the hypervisor may be installed based on a first operating system (host operating system) 110, and a second operating system (guest operating system) 120 may operate on a virtual machine that is supported by the hypervisor.

Below, embodiments will be described under the assumption that the hypervisor type-2 scheme is applied to the electronic device 101, that is, that the hypervisor is installed on the host operating system and the guest operating system is driven through the hypervisor. However, these conditions are exemplary only for the purposes of explaining the various embodiments of the present disclosure and embodiments of the present disclosure are not limited thereto. For example, the hypervisor type-1 scheme may be applied to the electronic device 101.

The electronic device 101 may run a host operating system 110 and a guest operating system 120. The host operating system 110 and the guest operating system 120 may operate independently of each other. The host operating system 110 and the guest operating system 120 may in turn be used to run separate apps. The host operating system 110 and the guest operating system 120 may also exchange information regarding apps running on the host and guest operation systems.

FIG. 1A illustrates an embodiment in which an app "A" and an app "B" are executed on the host operating system 110 and an app "C" and an app "D" are executed on the guest operating system 120. However, embodiments are not limited thereto.

According to one embodiment, the host operating system 110 may be installed before the guest operating system 120 is installed. The hypervisor 116 may be run on a kernel (or host kernel) 112 of the host operating system 110. The guest operating system 120 may be virtualized and be running on top of the hypervisor 116 (hypervisor type-2).

The exemplary embodiment in FIG. 1A shows the electronic device 101 including one guest operating system 120. However, embodiments are not limited thereto. For example, the electronic device 101 may include a plurality of guest operating systems.

The host operating system 110 may include a host module 111, the host kernel 112, a host platform 113, a host application 114, an app list creation module 115, the hypervisor 116, and a virtualization platform 117.

The host module 111 may receive information (hereinafter referred to as "guest app execution information") about an app, which is running on the guest operating system 120 from a guest module 121. For example, the host module 111 may receive guest app execution information regarding the most recent app opened on the guest operating system 120.

The host module 111 may provide the received guest app execution information to the app list creation module 115 in the host operating system 110. The app list creation module 115 may unify information about an app, which is being currently executed on the host operating system (hereinafter referred to as "host app execution information"), and the guest app execution information to output a list (hereinafter referred to as "app execution list").

According to one embodiment, the host module 111 may collect the host app execution information and may send the collected host app execution information to the guest module 121. According to one embodiment, the guest module 121 may convert the host app execution information and may send the converted host app execution information to the guest operating system 120. The guest operating system 120 may output the unified app execution list. In the examples below, the host operating system 110 outputs the unified app execution list, rather than the guest operating system 120. However, embodiments are not limited thereto and the guest operating system may output the unified app execution list.

The host kernel 112 may manage system resources and device drivers. The hypervisor 116 may run on the host kernel 112. The host platform 113 may provide an environment for running applications on the host operating system 110. According to one embodiment, the host platform 113 may include a framework and a library.

The host application 114 may be an application running on the host operating system 110. FIG. 1A shows an exemplary embodiment where the app "A" and the app "B" are executing on the host operating system 110. However, embodiments are not limited thereto.

The app list creation module 115 may combine the host app execution information collected in the host operating system 110 and the guest app execution information obtained through the host module 111 from the guest operation system 120 to output the unified app execution list. The app list creation module 115 may provide a user with the app execution list through various screen configurations.

The hypervisor 116 may be the basis for running the virtualization platform 117 which in turn may be the basis for the guest operating system 120. The hypervisor 116 may be installed based on the host kernel 112. The hypervisor 116 may include the backend device driver 116a. The backend device driver 116a may perform abstraction with respect to a physical device driver of the host kernel 112 so as to be connected to a frontend device driver 117a in the virtualization platform 117.

The virtualization platform 117 may operate based on the hypervisor 116, and the guest operating system 120 may be installed thereon. The virtualization platform 117 may include the frontend device driver 117a. The frontend device driver 117a may be connected to the backend device driver 116a in the hypervisor 116.

The guest operating system 120 may be running on top of the virtualization platform 117. The guest operating system 120 may include the guest module 121, a guest kernel 122, a guest platform 123, and a guest application 124.

The guest module 121 may collect execution information about guest apps running on the guest operating system 120. The guest app execution information may include information such as an app name, a screen shot of the app, an execution start time, an end time (i.e. when the app was terminated), information for directly executing an app, and the like. The host module 111 may provide the collected guest app execution information to the host module 111 in the host operating system 110.

The guest kernel 122 may include a device driver 122a. The device driver 122a may be connected to the frontend device driver 117a of the virtualization platform 117.

The guest platform 123 may provide an environment for running guest applications. The guest platform 123 may include a framework and a library. The guest application 124 may be an application running on the guest operating system 120. In FIG. 1A, an exemplary embodiment is shown with the guest application 124 being the app "C" and the app "D". However, embodiments are not limited thereto.

Figure 1B:
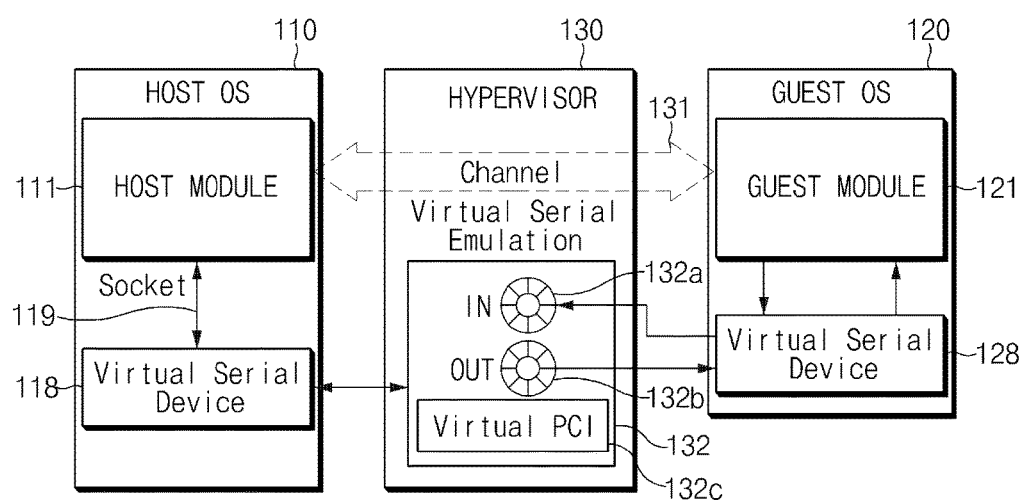
FIG. 1B is a configuration diagram for describing establishment of a data communication channel between operating systems, according to one embodiment of the present disclosure.

FIG. 1B is a configuration diagram for describing establishment of a data communication channel between operating systems, according to one embodiment of the present disclosure.

Referring to FIG. 1B, the host operating system 110 and the guest operating system 120 may exchange a variety of information, which is associated with app execution, through a channel 131 established through the hypervisor (e.g., KVM/QEMU) 116.

According to various embodiments, the channel 131 may be implemented through a virtual serial driver. The following para-virtualization may be applied to the embodiments of the present disclosure.

1. Transmission of Data from Guest Operating System to Host Operating System

In the guest operating system 120, the guest module 121 may record data associated with app execution using a virtual serial device (e.g., a PCI device) 128. The recorded data may be inputted to the hypervisor 130 (which may be the same as hypervisor 116 of FIG. 1A) through an input terminal 132a of virtual serial emulation (e.g., PCI emulation) 132 of the hypervisor 130.

In the host operating system 110, the host module 111 may be connected through a socket 119 to the virtual serial device 118 exposed to the hypervisor 130. The host module 111 may receive data associated with app execution in the guest operating system 120.

2. Transmission of Data from Host Operating System to Guest Operating System

Data may be recorded by host operating system 110 and sent through the socket 119. The recorded data may be sent to the guest operating system 120 through the virtual serial emulation (e.g., the PCI emulation) 132 of the hypervisor 130. The guest module 121 may read the recorded data through an output terminal 132b of the virtual serial emulation (e.g., the PCI emulation) 132.

According to one embodiment, the host operating system 110 and the guest operating system 120 may communicate with each other through a TCP/IP network socket, a serial driver pull emulation manner, or the like.

Figure 2:
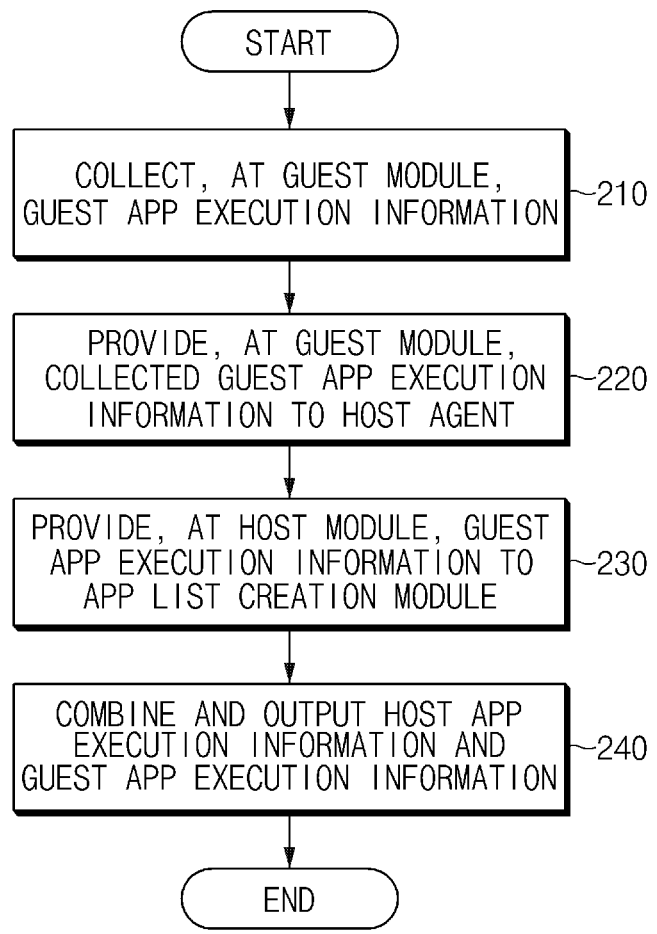
FIG. 2 is a flowchart illustrating a method for managing operating system according to one embodiment of the present disclosure.

FIG. 2 is a flowchart illustrating an method for managing operating system according to one embodiment of the present disclosure.

Referring to FIG. 2, in operation 210, the guest module 121 may collect guest app execution information on the guest operating system 120. The guest app execution information may include an app name, a screen shot, execution time information (e.g., a start time and an end time), information for directly executing an app, and the like.

In one embodiment, the guest module 121 may collect the guest app execution information if an event such as an app execution or end event, an operating system conversion event, an end event of an activated app, or the like is generated.

In one embodiment, the guest app execution information may include window setting information (window size, location, and status), sound output information, and information about the use of hardware resources (processor or memory use rate, priority information, and the like).

According to one embodiment, the guest module 121 may collect execution information about a visible app (i.e. a foreground app) such that the state of the app can be confirmed by the user, but it may not collect execution information with respect to an invisible app (i.e. an app running in the background). The guest module 121 may collect app execution information that the user directly needs, thereby improving information processing speed and reliability.

In operation 220, the guest module 121 may provide the collected guest app execution information to the host module 111. Communication between the guest module 121 and the host module 111 may be made by using a file exchange manner, data transmission through a virtual driver, such as that shown in FIG. 1B, an application programming interface (API), or the like.

In operation 230, the host module 111 may provide the received guest app execution information to the app list creation module 115 in the host operating system 110.

In operation 240, the app list creation module 115 may combine the host app execution information collected in the host operating system 110 and the guest app execution information obtained through the host module 111 to output a unified app execution list. The app list creation module 115 may provide a user with the app execution list through various screen configurations, some of which are discussed below. For example, the app list creation module 115 may partition the app execution list based on the operating systems and may include a separate image for each operating system to allow a user to confirm the operating system on which a particular app is running.

In one embodiment, the app list creation module 115 may determine and display the size of app execution information (e.g., a thumbnail image) based on the usage of the processor or memory of the electronic device. Additional information about an app execution list will be described with reference to FIG. 3.

Figure 3:
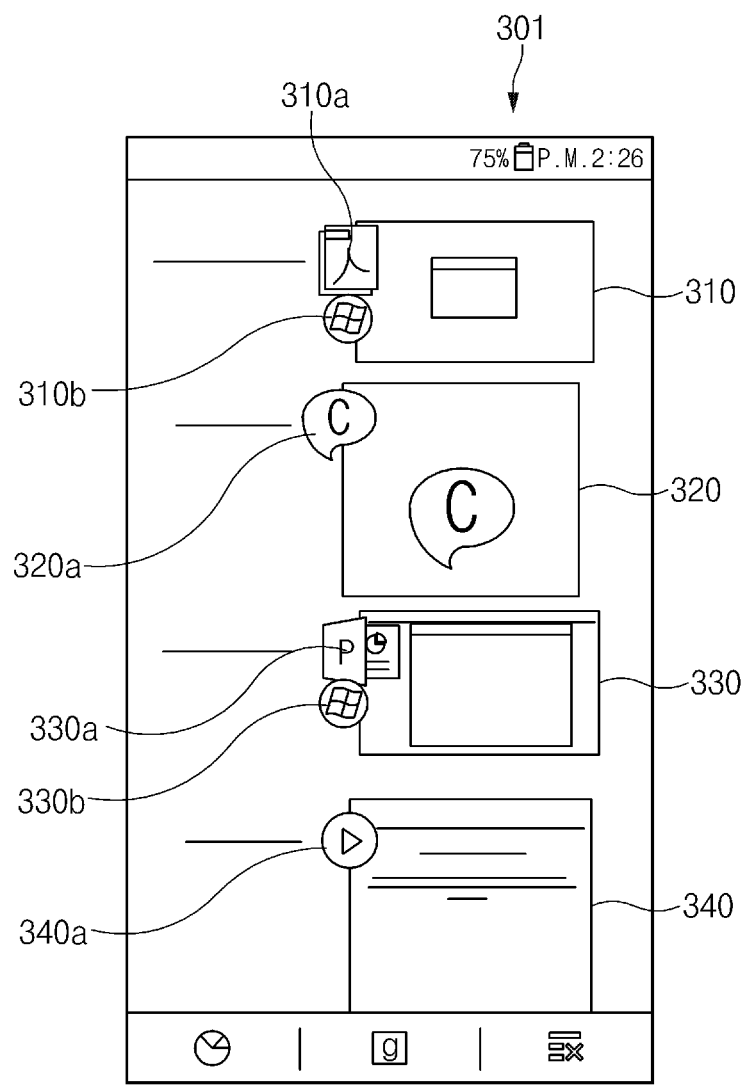
FIG. 3 is an exemplary view of a unified app execution list according to one embodiment of the present disclosure.

FIG. 3 is an exemplary view of a unified app execution list according to various embodiment of the present disclosure. In this embodiment, the host operating system 110 outputs the unified app execution list. However, embodiments are not limited thereto. For example, the guest operating system 120 may also output the app execution list.

Referring to FIG. 3, the app list creation module 115 of the host operating system 110 may combine a guest app execution list of the guest operating system 120 and a host app execution list to create a unified app execution list 301. A user may confirm apps being currently executed on the host and guest operating systems 110 and 120 or the most recently executed apps thereof through the app execution list 301 displayed on the display of the electronic device. Accordingly, the user may terminate an app by entering an input or may convert the host/guest operating system into the guest/host operating system to execute an app.

The app execution list 301 may enumerate apps in a list according to a designated order (e.g., in the order of app execution times). In FIG. 3, an exemplary embodiment is shown with the app execution list 301 including four apps. However, embodiments are not limited thereto.

The app execution list 301 may include a variety of information associated with the execution of apps 310 to 340. For example, the app execution list 301 may include execution screen shots, representative images 310a, 320a, 330a, and 340a, and the like of the apps 310 to 340.

According to one embodiment, the app execution list 301 may further include information (e.g., an operating system icon 310b or 330b) associated with an operating system on which an app is executing.

For example, in the case where the host operating system 110 is the Android operating system and the guest operating system 120 is the Windows operating system, the Android operating system may display a list of apps being executed on the Windows operating system, as well as a list of apps being executed on the Android operating system. In this case, the Android operating system may add and display a Windows operating system icon with respect to apps being executed on the Windows operating system.

According to one embodiment, an operating system icon also may not be displayed with respect to the app 320 or 340 executed on the host operating system 110.

Figure 4:
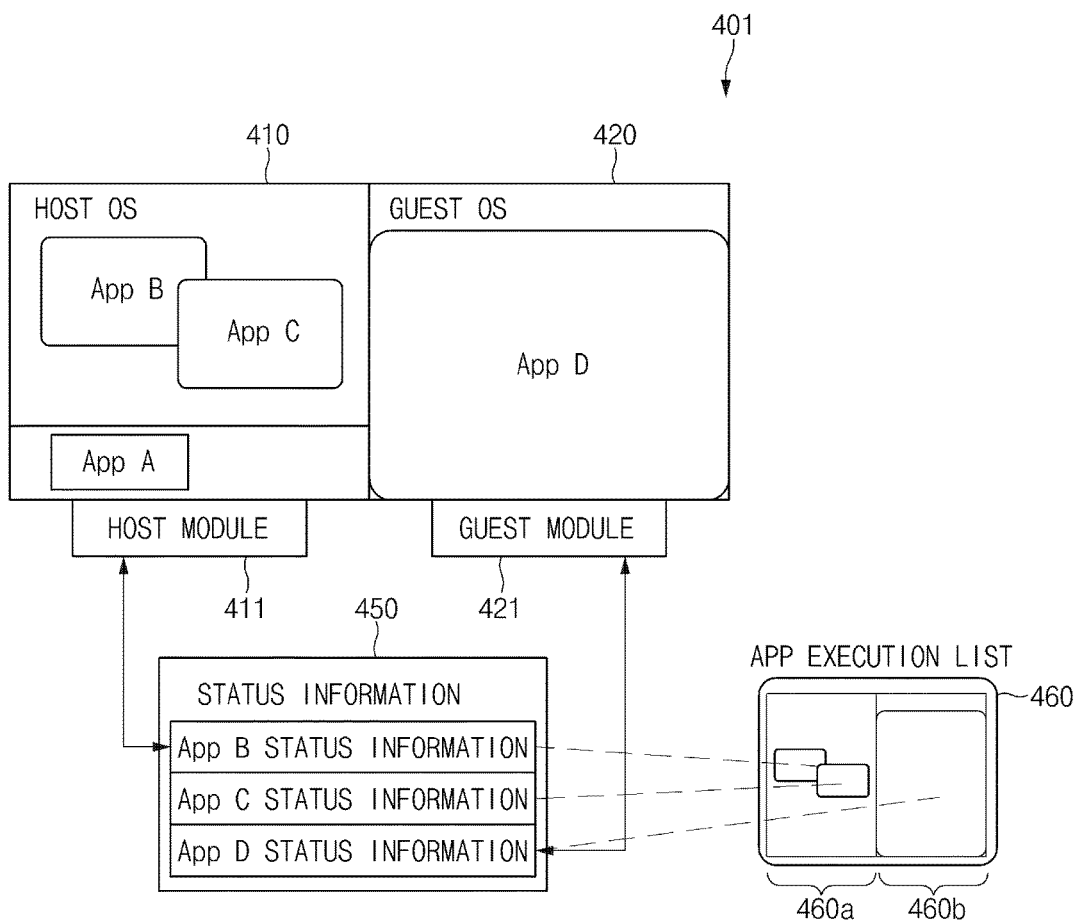
FIG. 4 is a block diagram for describing a process of exchanging status information, according to one embodiment of the present disclosure.

FIG. 4 is a block diagram for describing the process of exchanging status information, according to one embodiment of the present disclosure.

Referring to FIG. 4, a host operating system 410 and a guest operating system 420 may be running on an electronic device 401. The host operating system 410 and the guest operating system 420 may operate independently of each other.

The host operating system 410 may have apps "A" to "C", and the guest operating system 420 may have app "D". The app "A" running on the host operating system 410 may be an invisible app that is not displayed to the user because it is processed in the background. The invisible app may not be included in an app display list.

The host operating system 410 and the guest operating system 420 may exchange status information 450, which is associated with apps running in the operating system, with a host module 411 and a guest module 421. In one embodiment, the host operating system 410 and the guest operating system 420 may exchange status information for most recently opened apps. The status information 450 may include the size of a window, a location of the window, whether a screen is full, and the like. The status information 450 may be stored in a shared memory or may be exchanged through a socket communication or an inter-process communication (IPC) or the like.

In the case where the shared memory is used, the status information 450 may be stored in a shared memory area that both the host module 411 and the guest module 421 can access. Each of the host operating system 410 and the guest operating system 420 may store app execution information about an app executing in the respective operating system in the shared memory. The host module 411 may provide app execution information to the host operating system 410 including the guest app execution information that the guest module 421 stored in the shared memory. Similar to the guest module 421, the host module 411 may provide app execution information to the guest operating system 420 that includes the host app execution information that the host module 411 stored in the shared memory. The host operating system 410 may combine the host app execution information collected therein and the guest app execution information provided through the host module 411 from the guest module 421 to display an app execution list 460.

According to one embodiment, the app execution list 460 may include a first area 460a for outputting the host app execution information and a second area 460b for outputting the guest app execution information. The host operating system 410 may output app execution information of the host and guest operating systems 410 and 420 on the partitioned areas 460a and 460b so that the user can intuitively understand the apps running on the respective operating systems.

Figure 5A:
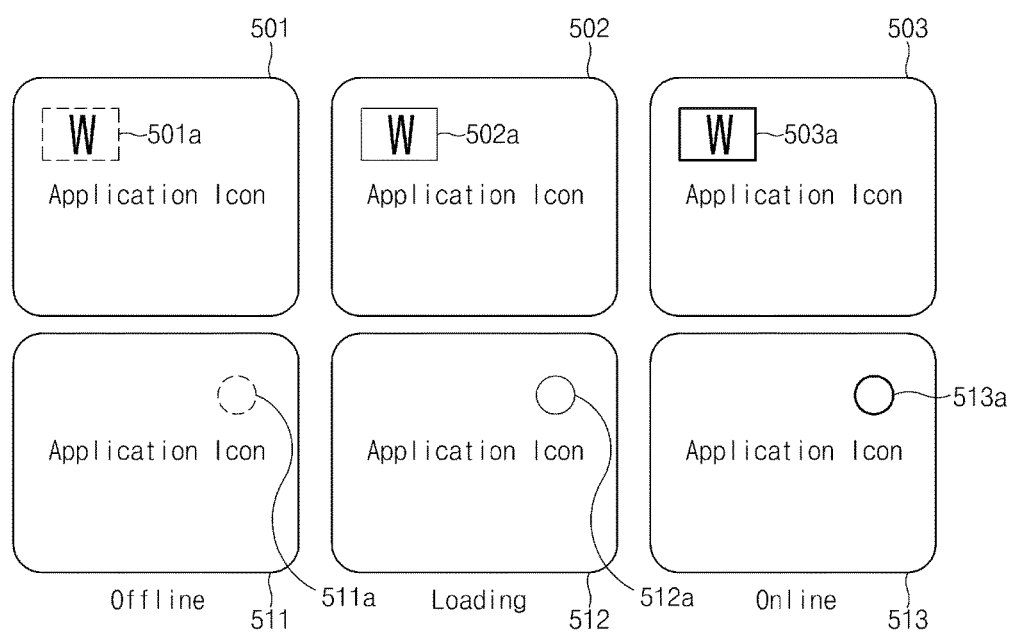
FIG. 5A and FIG. 5B are exemplary views of an output of an app list indicating a state of an operating system, according to one embodiment of the present disclosure.
Figure 5B:
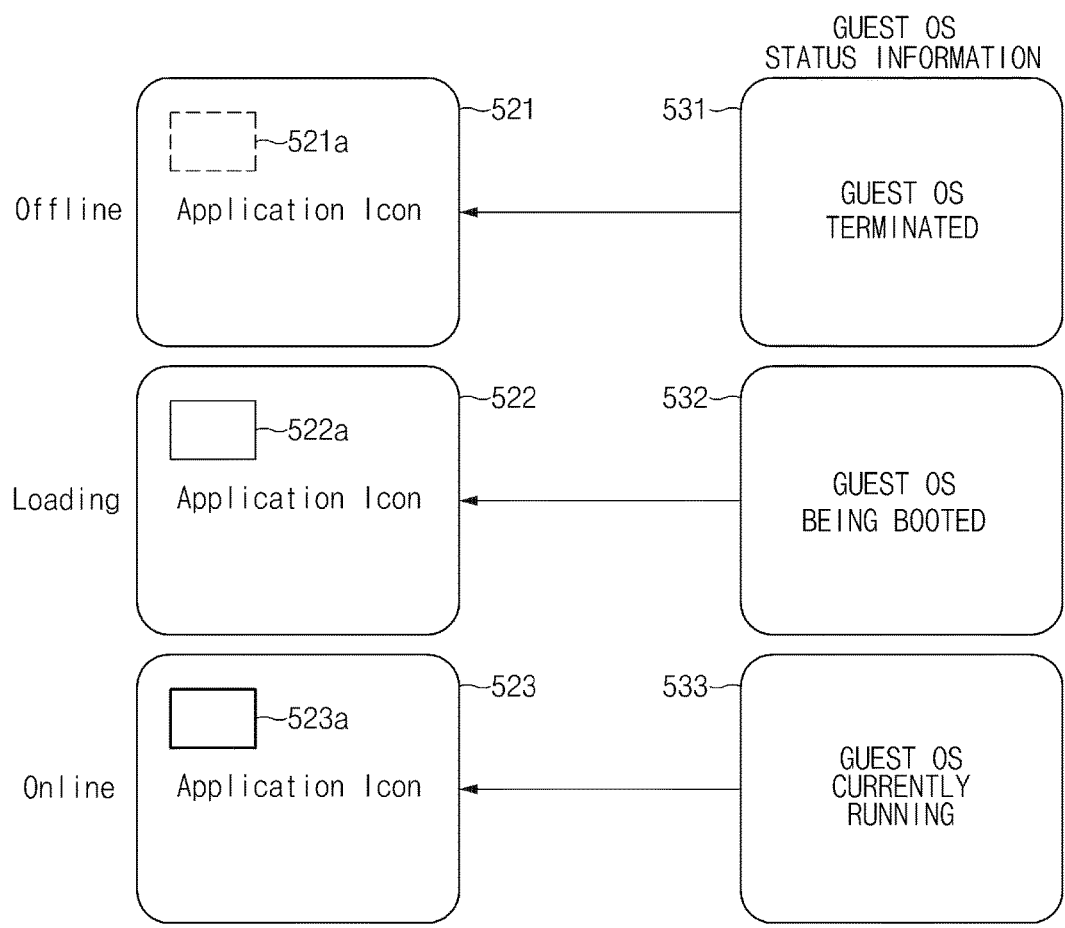

FIGS. 5A and 5B are exemplary views of an output of an app list indicating a state of an operating system, according to one embodiment of the present invention. FIGS. 5A and 5B are only exemplary, and the present disclosure is not limited thereto.

Referring to FIG. 5A, in app icons 501 to 503, each of app kind icons 501a to 501c may indicate the app corresponding to the app icon. In this case, the app kind icons 501a to 501c may indicate a Word application. Each of the app kind icons 501a to 501c may also indicate the status of the operating system on which an app is executed. For example, in the app icon 501, the app kind icon 501a may have a dotted line indicating that the operating system on which the app is executed has terminated. In the app icon 502, the app kind icon 502a may include a solid line indicating that the operating system is being booted. In the app icon 503, the app kind icon 503a may have a bold line indicating that the operating system has completed booting and is currently running. The above-described representation method for the app kind icons 501a to 503a is only exemplary, and the present disclosure is not limited thereto. For example, the app kind icons 501a to 503a may be respectively displayed with different colors (e.g., gray, orange, and green colors).

In another embodiment, in the app icons 511 to 513, operating system icons 511a to 513a each indicating the status of the operating system corresponding to the app may be displayed together with app kind icons 501a to 503a. Each of the operating system icons 511a to 513a may be an icon indicating the kind of operating system (e.g. whether the host operating system or the guest operating system) on which the app is executed.

For example, in the app icon 511, the operating system icon 511a may include a dotted line indicating that the operating system on which an app is executed has terminated. In the app icon 512, the operating system icon 512a may include a solid line indicating that the operating system is being booted. In the app icon 513, the operating system icon 513a may include a bold line indicating that the operating system has completed booting and is currently running. The above-described representation method for the operating system icons 511a to 513a is only exemplary, and the present disclosure is not limited thereto. For example, the operating system icons 511a to 513a may be respectively displayed with different colors (e.g., gray, orange, and green colors).

Referring to FIG. 5B, the app icons 521 to 523 may include status indication icons 521a to 523a each indicating the status of the operating system. Each of the status indication icons 521a to 523a may indicate status information of an operating system on which an app is executed, similar to that described above for operating system icons 511a to 513a.

In one embodiment, each of the status indication icons 521a to 523a may indicate a status of an operating system, on which an app is executed, through a visual effect or text expression.

For example, in the app icon 521, the status indication icon 521a may include a dotted line to indicate that the operating system on which an app is executed has terminated. In the app icon 522, the status indication icon 522a may include a solid line to indicate that the operating system is being booted. In the app icon 523, the status indication icon 523a may include a bold line to indicate that the operating system has completed booting and is currently running. The above-described representation method for the status indication icons 521a to 523a is only exemplary, and the present disclosure is not limited thereto.

As another example, each of the status indication icons 531 to 533 may directly indicate the status of the host operating system 410 or the guest operating system 420 in the form of a text. Each of the status indication icons 531 to 533 may include a text indicating "terminated", "being booted", "currently running", or the like.

Figure 6:
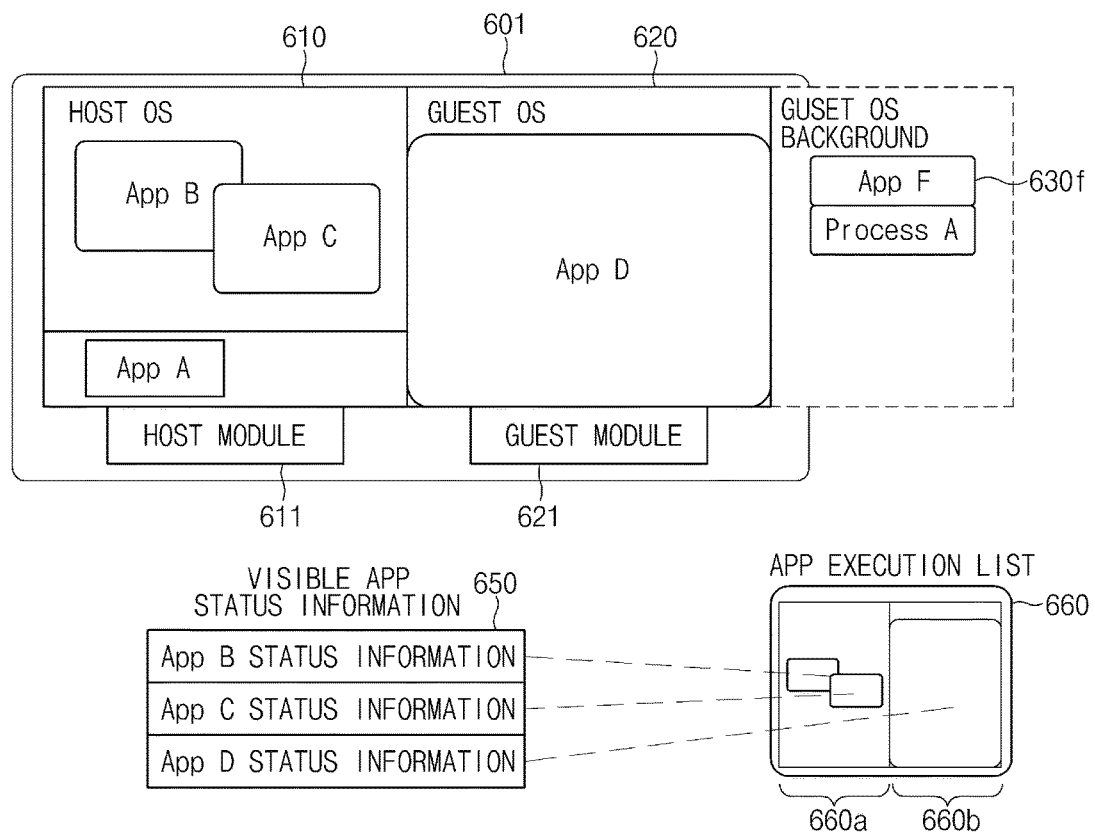
FIG. 6 is a block diagram for describing a method for managing operating system when a background app is being executed, according to one embodiment of the present disclosure.

FIG. 6 is a block diagram for describing a method for managing operating system when a background app is being executed, according to one embodiment of the present disclosure.

Referring to FIG. 6, an electronic device 601 may be running a host operating system 610 and a guest operating system 620. The host operating system 610 and the guest operating system 620 may operate independently of each other. The host operating system 110 and the guest operating system 620 may in turn run separate apps. The host operating system 610 and the guest operating system 620 may exchange information, which is associated with apps being driven thereon, through a host module 611 and a guest module 621.

In FIG. 6, the host operating system 610 executes apps "A", "B", and "C". The app "A" may be an invisible app (i.e. an app running in the background and not visible to the user), and the apps "B" and "C" may be visible apps (i.e. an app running in the foreground and visible to the user).

The guest operating system 620 may execute apps "D" and "F". The app "D" may be a visible app, and the app "F" may be an invisible app that is executed in the background.

The host operating system 610 may store execution information of visible apps respectively running on the host and guest operating systems 610 and 620 in a shared memory.

The host operating system 610 may combine host app execution information collected therein and guest app execution information provided by the host module 611 to display an app execution list 660.

According to one embodiment, the app execution list 660 may include a first area 660a outputting the host app execution information and a second area 460b outputting the guest app execution information. The host operating system 610 may output app execution information of the host and guest operating systems 610 and 620 in the first and second areas 660a and 660b so that the user can intuitively understand the apps running on respective operating systems.

Figure 7:
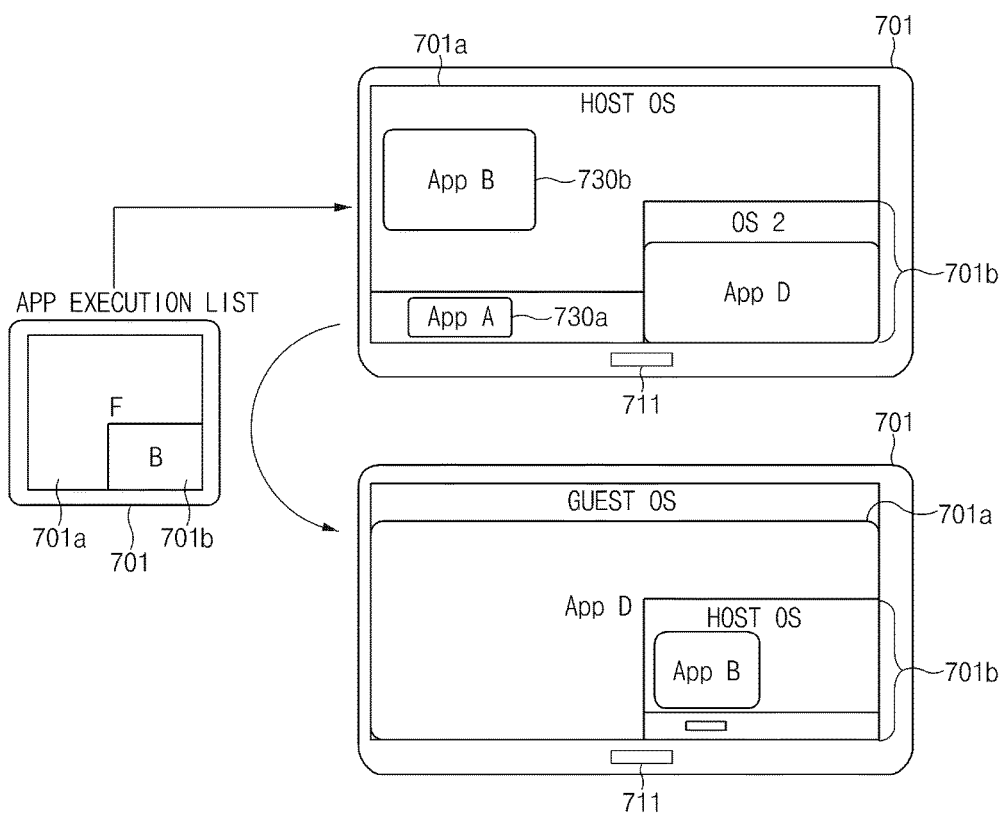
FIG. 7 is a block diagram for describing a method for managing operating systems based on priorities, according to one embodiment of the present disclosure.

FIG. 7 is a block diagram for describing a method for managing operating systems based on priorities, according to one embodiment of the present disclosure.

Referring to FIG. 7, an app execution list 701 may output areas (a main area 701a and a sub area 701b) that are partitioned according to priorities of the plurality of operating systems running on the electronic device 710.

In an embodiment where a host operating system and a guest operating system respectively operate as a foreground operating system and a background operating system, in the app execution list 701, apps "A" and "B" running on the host operating system may be displayed on the main area 701a, and an app "D" running on the guest operating system may be displayed on the sub area 701b.

In an embodiment where a user converts the foreground/background operating system into the background/foreground operating system through an operating system conversion button 711, the guest operating system may operate as the foreground operating system, and the host operating system may operate as the background operating system. In this case, a screen of the app execution list 701 may be converted such that the app "D" running on the guest operating system is displayed on the main area 701a and the apps "A" and "B" running on the host operating system are displayed on the sub area 701b.

Figure 8:
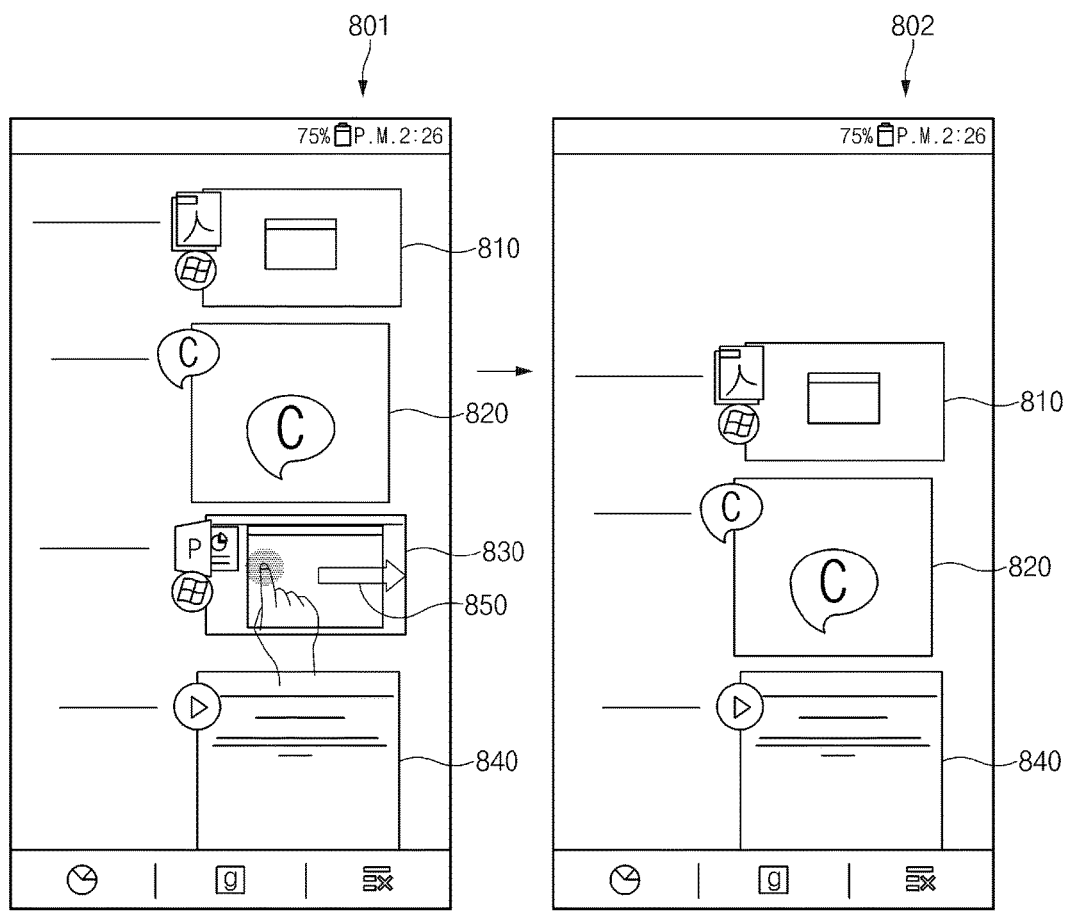
FIG. 8 is an exemplary screen view for describing manipulation of an app execution list, according to one embodiment of the present disclosure.

FIG. 8 is an exemplary screen view for describing the manipulation of an app execution list, according to one embodiment of the present disclosure. FIG. 8 is only exemplary, and the present disclosure is not limited thereto.

Referring to FIG. 8, an app execution list 801 may indicate that apps 810 to 840 are being executed on an electronic device. The apps 810 and 830 may be apps that are executed on the guest operating system, and the apps 820 and 840 may be apps that are executed on the host operating system. A user may identify an operating system on which each app is executing via the operating system icon displayed in each app icon.

In the case where a user wants to end the app 830 running on the guest operating system while the app execution list 801 is outputted by the host operating system, the user may end the app 830 through a swipe input 850. The host operating system may store information about the execution or termination of the app 830 running on the guest operating system. If the swipe input 850 of the user is generated, the host operating system may end the app 830 based on the stored information.

Figure 9:
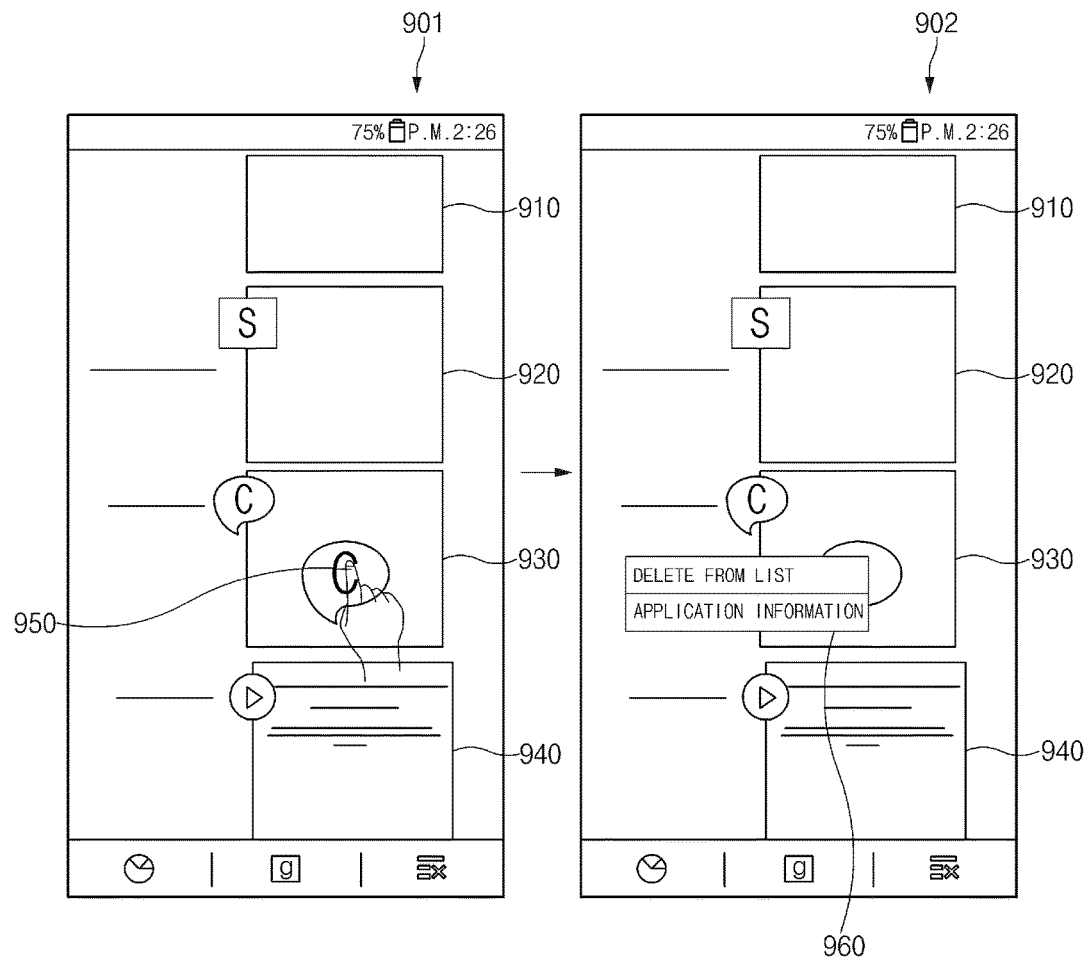
FIG. 9 is an exemplary screen view for describing execution of an additional function through an app execution list, according to one embodiment of the present disclosure.

FIG. 9 is an exemplary screen view for describing the execution of an additional function through an app execution list, according to one embodiment of the present disclosure.

Referring to FIG. 9, an app execution list 901 may indicate that apps 910 to 940 are being executed on an electronic device. The apps 910 and 930 may be apps that are executed on the guest operating system, and the apps 920 and 940 may be apps that are executed on a host operating system. A user may identify an operating system on which each app is executing via the operating system icon displayed in each app icon.

In the case where a user wants to perform an additional function in the app execution list 901 while the app execution list 901 is outputted by the host operating system, the user may generate a touch input 950.

For example, in the case where the touch input 950 is a short tap on the app 930, which is executed in the guest operating system and the currently running operating system is the host operating system, the currently running operating system may be changed to the guest operating system, and thus the app 930 may be executed.

As another example, in the case where the touch input 950 is a long tap and hold on the app 930, the host operating system may generate an additional function list 960 at an area adjacent to a point where the touch input 950 is generated.

The user may execute a function by selecting one of additional functions in the list 960.

According to one embodiment, a method for managing operating system executed by an electronic device may include obtaining, by a guest module of the guest operating system, information regarding a guest app executable on the guest operating system, providing, by the guest module, the information regarding the guest app to a host module of the host operating system, providing, by the host module, the information regarding the guest app to an app list creation module of the host operating system, combining, by the app list creation module, information regarding a host app executable on the host operating system and the information regarding the guest app, and outputting, by the app list creation module, an app execution list that includes the combined information.

According to one embodiment, the guest module operates in a virtual environment supported by a hypervisor installed on a kernel of the host operating system. The information regarding the guest app comprises at least one of an app name, a screen shot, execution time information, app execution information, app termination information, app window information, sound output information, or hardware usage information.

According to one embodiment, the app execution list includes an icon of the guest operating system and a representative image of the guest app. An icon of the guest operating system is variable according to a booting status of the guest operating system.

According to one embodiment, the information regarding the host app is arranged in a first area of the app execution list and the information regarding the guest app is arranged in a second area of the app execution list. The app execution list is separated into a main area and a sub area, and the method further includes outputting the information regarding the host app in the main area when the host operating system is a foreground operating system and outputting the information regarding the guest app in the sub area when the host operating system is the foreground operating system.

According to one embodiment, the providing the information regarding the guest app may include storing the information regarding the guest app in a shared memory accessibly by the guest module and the host module. The providing the information regarding the guest app may include providing the information regarding the guest app via a virtual serial driver of a hypervisor.

According to one embodiment, the method may further include receiving a user input associated with the app execution list. The user input comprises at least one of a touch input or a voice input. The method may further include interrupting a process of an app corresponding to the user input. The method may further include displaying a list for functions operable on an app corresponding to the user input.

According to one embodiments, an method for managing operating system executed on an electronic device that drives first and second operating systems may include obtaining, by the second operating system, information regarding a first app executable on the second operating system, providing, by the second operating system, the information to the first operating system, combining, by the first operating system, the information from the second operation system and information regarding a second app executable on the first operating system, and outputting, by the first operation system, the combined information.

According to one embodiment, the second operating system operates in a virtual environment supported by a hypervisor installed on a kernel of the first operating system. The first and second operating systems operate in a virtual environment supported by a hypervisor.

According to one embodiment, an electronic device may include a host operating system including a host module and an app list creation module, and a guest operating system including a guest module, wherein the guest module obtains information regarding a guest app executable on the guest operating system and provides the information regarding the guest app to the host module, the host module provides the information regarding the guest app to the app list creation module, and the app list creation module combines information regarding a host app executable on the host operating system and the information regarding the guest app and outputs an app execution list that includes the combined information. The guest operating system operates in a virtual environment supported by a hypervisor installed on a kernel of the host operating system. The electronic device may further include a shared memory accessible by the guest module and the host module.

According to one embodiment, a computer-readable recording medium having recorded thereon a program for executing a method including obtaining, by a guest module driven of a guest operating system, information regarding a guest app executable on the guest operating system, providing, by the guest module, the information regarding the guest app to a host module of a host operating system, providing, by the host module, the information regarding the guest app to an app list creation module of the host operating system, combining, by the app list creation module, information regarding a host app executable on the host operating system and the information regarding the guest app, and outputting, by the app list creation module, an app execution list that includes the combined information.

Figure 10:
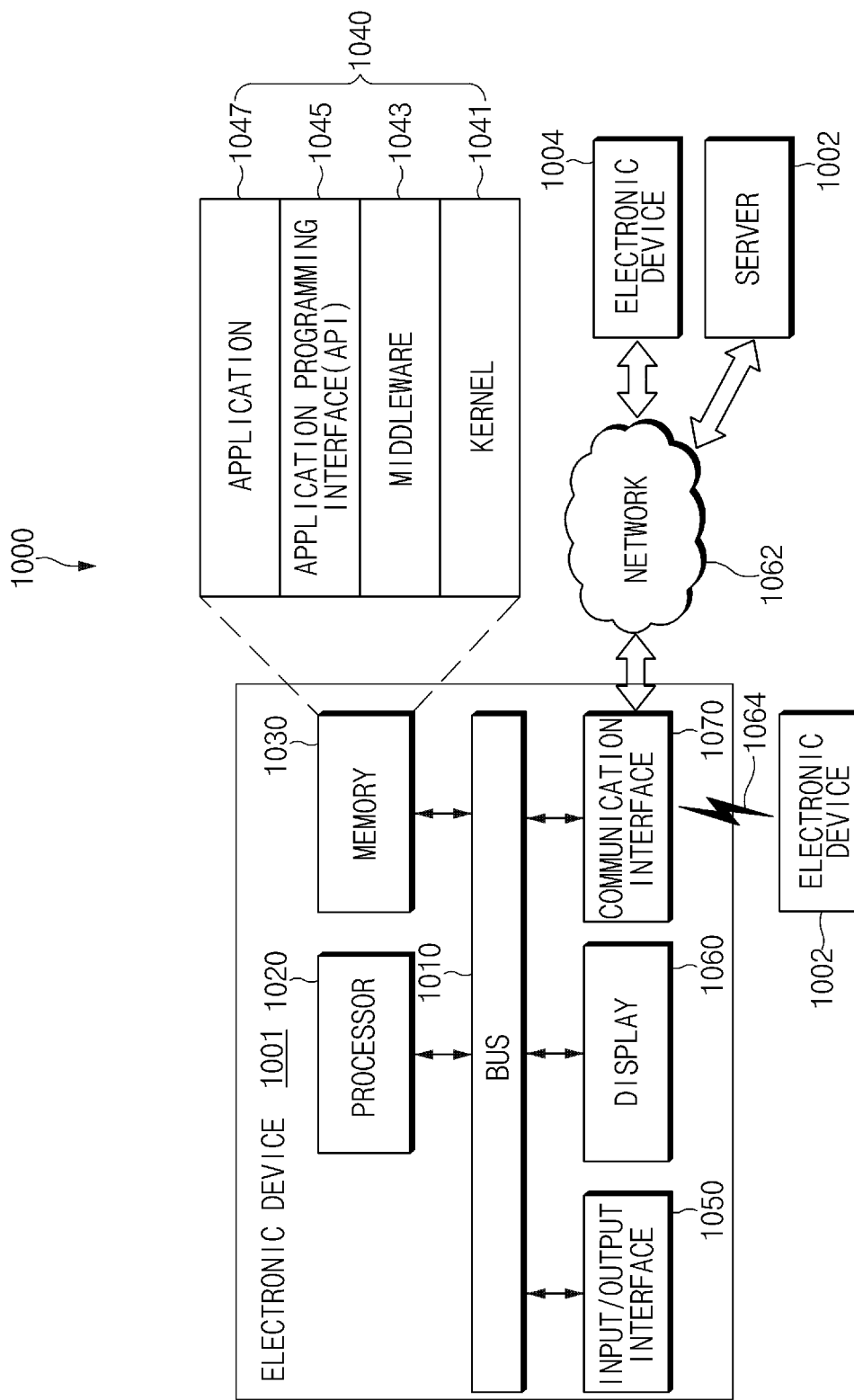
FIG. 10 is a diagram illustrating an electronic device in a network environment, according to various embodiments of the present disclosure.

FIG. 10 is a diagram illustrating an electronic device in a network environment, according to various embodiments of the present disclosure.

Referring to FIG. 10, there is illustrated an electronic device 1001 in a network environment 1000 according to various embodiments. The electronic device 1001 may include a bus 1010, a processor 1020, a memory 1030, an input/output (I/O) interface 1050, a display 1060, and a communication interface 1070. According to an embodiment, the electronic device 1001 may not include at least one of the above-described elements or may further include other element(s).

For example, the bus 1010 may interconnect the above-described elements 1020 to 1070 and may include a circuit for conveying communications (e.g., a control message and/or data) among the above-described elements.

The processor 1020 (e.g., the processor 1110 of FIG. 11) may include one or more of a central processing unit (CPU), an application processor (AP), or a communication processor (CP). The processor 1020 may perform, for example, data processing or an operation associated with control and/or communication of at least one other element(s) of the electronic device 1001. An artisan understands and appreciates that a "processor" or "microprocessor" constitute hardware in the claimed invention. Under the broadest reasonable interpretation, the appended claims constitute statutory subject matter in compliance with 35 U.S.C. § 101. In addition, a processor as described herein may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

The memory 1030 (e.g., the memory 1130 of FIG. 11) may include a volatile and/or nonvolatile memory. For example, the memory 1030 may store instructions or data associated with at least one other element(s) of the electronic device 1001. According to an embodiment, the memory 1030 may store software and/or a program 1040. The program 1040 may include, for example, a kernel 1041, a middleware 1043, an application programming interface (API) 1045, and/or an application program (or "application") 1047. At least a part of the kernel 1041, the middleware 1043, or the API 1045 may be called an "operating system (OS)".

The kernel 1041 may control or manage system resources (e.g., the bus 1010, the processor 1020, the memory 1030, and/or other hardware and software resources) that are used to execute operations or functions of other programs (e.g., the middleware 1043, the API 1045, and the application program 1047). Furthermore, the kernel 1041 may provide an interface that allows the middleware 1043, the API 1045, or the application program 1047 to access discrete elements of the electronic device 1001 so as to control or manage system resources.

The middleware 1043 may perform a mediation role such that the API 1045 or the application program 1047 communicates with the kernel 1041 to exchange data.

Furthermore, the middleware 1043 may process one or more task requests received from the application program 1047 according to a priority. For example, the middleware 1043 may assign the priority, which makes it possible to use a system resource (e.g., the bus 1010, the processor 1020, the memory 1030, or the like) of the electronic device 1001, to at least one of the application program 1047. For example, the middleware 1043 may process the one or more task requests according to the priority assigned to the at least one, which makes it possible to perform scheduling or load balancing on the one or more task requests.

The API 1045 may be an interface through which the application 1047 controls a function provided by the kernel 1041 or the middleware 1043, and may include, for example, at least one interface or function (e.g., an instruction) for a file control, a window control, image processing, a character control, or the like.

The I/O interface 1050 may transmit an instruction or data, input from a user or another external device, to other element(s) of the electronic device 1001. Furthermore, the I/O interface 1050 may output an instruction or data, received from other element(s) of the electronic device 1001, to a user or another external device.

The display 1060 may include, for example, a liquid crystal display (LCD), a light-emitting diode (LED) display, an organic LED (OLED) display, or a microelectromechanical systems (MEMS) display, or an electronic paper display. The display 1060 may display, for example, various kinds of content (e.g., a text, an image, a video, an icon, a symbol, and the like) to a user. The display 1060 may include a touch screen and may receive, for example, a touch, gesture, proximity, or hovering input using an electronic pen or a portion of a user's body using capacitive, resistive, or another type of technology.

The communication interface 1070 may establish communication between the electronic device 1001 and an external device (e.g., a first external electronic device 1002, a second external electronic device 1004, or a server 1006). For example, the communication interface 1070 may be connected to a network 1062 through wireless communication or wired communication to communicate with an external device (e.g., the second external electronic device 1004 or the server 1006).

The wireless communication may include at least one of, for example, LTE (long-term evolution), LTE-A (LTE Advance), CDMA (Code Division Multiple Access), WCDMA (Wideband CDMA), UMTS (Universal Mobile Telecommunications System), WiBro (Wireless Broadband), or GSM (Global System for Mobile Communications), or the like, as cellular communication protocol. Furthermore, the wireless communication may include, for example, a local area network 1064. The local area network 1064 may include at least one of a wireless fidelity (Wi-Fi), a near field communication (NFC), or a global navigation satellite system (GNSS), or the like. The GNSS may include at least one of a global positioning system (GPS), a global navigation satellite system (Glonass), Beidou Navigation Satellite System (hereinafter referred to as "Beidou"), the European global satellite-based navigation system (Galileo), or the like. In this specification, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1062 may include at least one of telecommunications networks, for example, a computer network (e.g., LAN or WAN), an Internet, or a telephone network.

Each of the first and second external electronic devices 1002 and 1004 may be a device of which the type is different from or the same as that of the electronic device 1001. According to an embodiment, the server 1006 may include a group of one or more servers. According to various embodiments, all or a portion of operations that the electronic device 1001 will perform may be executed by another or plural electronic devices (e.g., the external electronic devices 1002 and 1004 or the server 1006). According to an embodiment, in the case where the electronic device 1001 executes any function or service automatically or in response to a request, the electronic device 1001 may not perform the function or the service internally, but, alternatively additionally, it may request at least a part of a function associated with the electronic device 101 at other device (e.g., the external electronic device 1002 or 1004 or the server 1006). The other electronic device (e.g., the external electronic device 1002 or 1004 or the server 1006) may execute the requested function or additional function and may transmit the execution result to the electronic device 1001. The electronic device 1001 may provide the requested function or service using the received result or may additionally process the received result to provide the requested function or service. To this end, for example, cloud computing, distributed computing, or client-server computing may be used.

Figure 11:
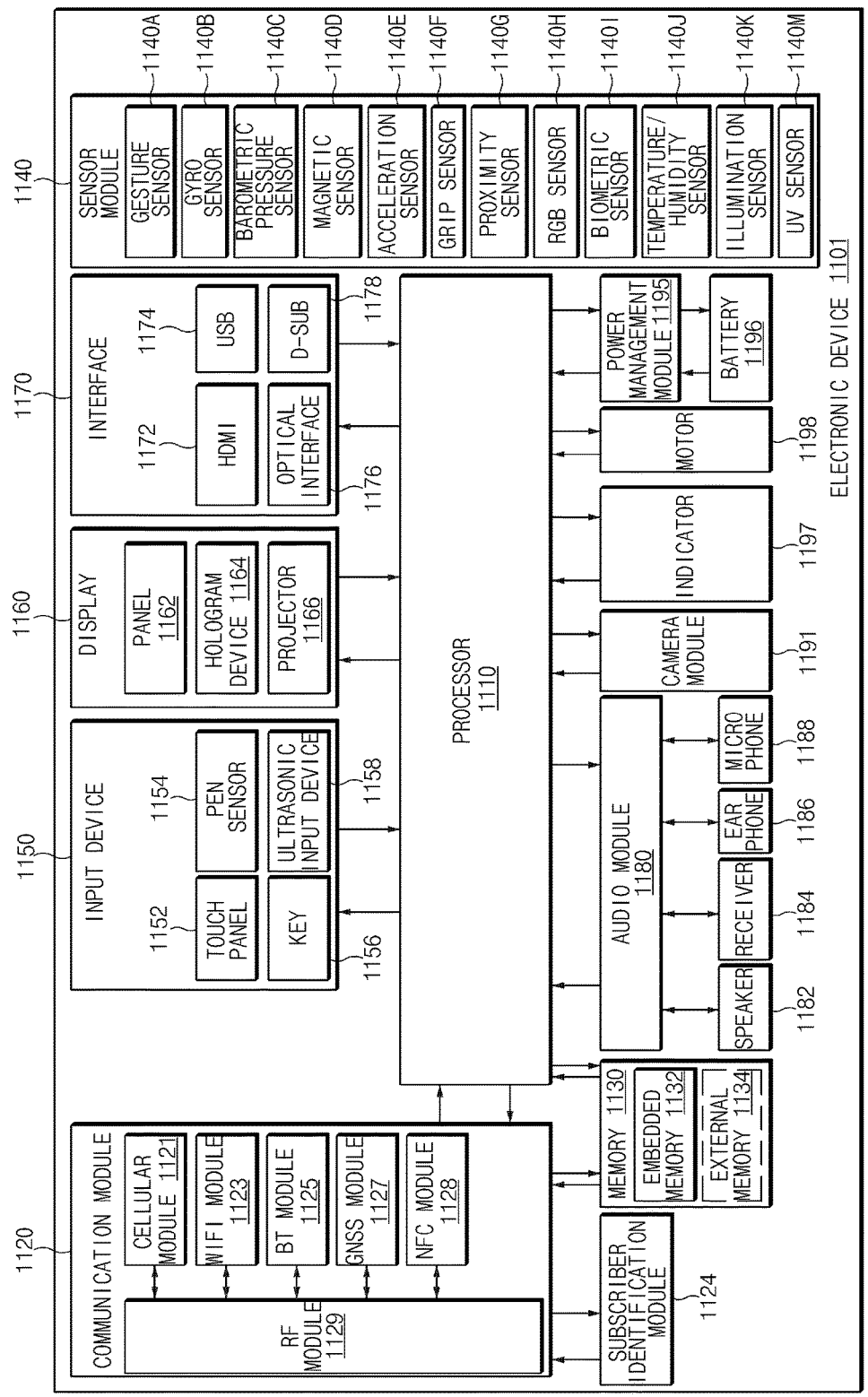
FIG. 11 is a block diagram of an electronic device according to various embodiments of the present disclosure.

FIG. 11 is a block diagram of an electronic device according to various embodiments of the present disclosure. An electronic device 1101 may include, for example, all or a part of the electronic device 101 illustrated in FIG. 1. The electronic device 1101 may include one or more processors (e.g., an application processor (AP)) 1110, a communication module 1120, a subscriber identification module 1124, a memory 1130, a sensor module 1140, an input device 1150, a display 1160, an interface 1170, an audio module 1180, a camera module 1191, a power management module 1195, a battery 1196, an indicator 1197, and a motor 1198. The terms "unit" or "module" referred to herein may be understood as comprising hardware such as a processor or microprocessor configured for a certain desired functionality, or a non-transitory medium comprising machine executable code, in accordance with statutory subject matter under 35 U.S.C. § 101 and does not constitute only software per se.

The processor 1110 may drive an operating system (OS) or an application to control a plurality of hardware or software elements connected to the processor 1110 and may process and compute a variety of data. The processor 1110 may be implemented with a System on Chip (SoC), for example. According to an embodiment, the processor 1110 may further include a graphic processing unit (GPU) and/or an image signal processor. The processor 1110 may include at least a part (e.g., a cellular module 1121) of elements illustrated in FIG. 11. The processor 1110 may load and process an instruction or data, which is received from at least one of other elements (e.g., a nonvolatile memory) and may store a variety of data in a nonvolatile memory.

The communication module 1120 may be configured the same as or similar to the communication interface 1070 of FIG. 10. The communication module 1120 may include a cellular module 1121, a Wi-Fi module 1123, a Bluetooth (BT) module 1125, a GNSS module 1127 (e.g., a GPS module, a Glonass module, a Beidou module, or a Galileo module), a near field communication (NFC) module 1128, and a radio frequency (RF) module 1129.

The cellular module 1121 may provide voice communication, video communication, a message service, an Internet service or the like through a communication network. According to an embodiment, the cellular module 1121 may perform discrimination and authentication of the electronic device 1101 within a communication network using the subscriber identification module 1124 (e.g., a SIM card), for example. According to an embodiment, the cellular module 1121 may perform at least a portion of functions that the processor 1110 provides. According to an embodiment, the cellular module 1121 may include a communication processor (CP).

Each of the Wi-Fi module 1123, the BT module 1125, the GNSS module 1127, and the NFC module 1128 may include a processor for processing data exchanged through a corresponding module, for example. According to an embodiment, at least a part (e.g., two or more elements) of the cellular module 1121, the Wi-Fi module 1123, the BT module 1125, the GNSS module 1127, or the NFC module 1128 may be included within one Integrated Circuit (IC) or an IC package.

The RF module 1129 may transmit and receive, for example, a communication signal (e.g., an RF signal). The RF module 1129 may include, for example, a transceiver, a power amplifier module (PAM), a frequency filter, a low noise amplifier (LNA), an antenna, or the like. According to another embodiment, at least one of the cellular module 1121, the Wi-Fi module 1123, the BT module 1125, the GNSS module 1127, or the NFC module 1128 may transmit and receive an RF signal through a separate RF module.

The subscriber identification module 1124 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1130 (e.g., the memory 1030) may include an internal memory 1132 or an external memory 1134. For example, the internal memory 1132 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, or a solid state drive (SSD).

The external memory 1134 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 1134 may be functionally and/or physically connected with the electronic device 1101 through various interfaces.

The sensor module 1140 may measure, for example, a physical quantity or may detect an operation state of the electronic device 1101. The sensor module 1140 may convert the measured or detected information to an electric signal. The sensor module 1140 may include at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (e.g., red, green, blue (RGB) sensor), a biometric sensor 1140I, a temperature/humidity sensor 1140J, an illuminance sensor 1140K, or an UV sensor 1140M. Even though not illustrated, additionally or alternatively, the sensor module 1140 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 1140 may further include a control circuit for controlling at least one or more sensors included therein. According to an embodiment, the electronic device 1101 may further include a processor which is a part of the processor 1110 or independent of the processor 1110 and is configured to control the sensor module 1140. The processor may control the sensor module 1140 while the processor 1110 remains at a sleep state.

The input device 1150 may include, for example, a touch panel 1152, a (digital) pen sensor 1154, a key 1156, or an ultrasonic input device 1158. The touch panel 1152 may use at least one of capacitive, resistive, infrared and ultrasonic detecting methods. Also, the touch panel 1152 may further include a control circuit. The touch panel 1152 may further include a tactile layer to provide a tactile reaction to a user.

The (digital) pen sensor 1154 may be, for example, a portion of a touch panel or may include an additional sheet for recognition. The key 1156 may include, for example, a physical button, an optical key, a keypad, or the like. The ultrasonic input device 1158 may detect (or sense) an ultrasonic signal, which is generated from an input device, through a microphone (e.g., a microphone 1188) and may check data corresponding to the detected ultrasonic signal.

The display 1160 (e.g., the display 1060) may include a panel 1162, a hologram device 1164, or a projector 1166. The panel 1162 may be configured the same as or similar to the display 1060 of FIG. 10. The panel 1162 may be implemented to be flexible, transparent or wearable, for example. The panel 1162 and the touch panel 1152 may be integrated into a single module. The hologram device 1164 may display a stereoscopic image in a space using a light interference phenomenon. The projector 1166 may project light onto a screen so as to display an image. The screen may be arranged inside or outside the electronic device 1101. According to an embodiment, the display 1160 may further include a control circuit for controlling the panel 1162, the hologram device 1164, or the projector 1166.

The interface 1170 may include, for example, a high-definition multimedia interface (HDMI) 1172, a universal serial bus (USB) 1174, an optical interface 1176, or a D-subminiature (D-sub) 1178. The interface 1170 may be included, for example, in the communication interface 1070 illustrated in FIG. 10. Additionally or alternatively, the interface 1170 may include, for example, a mobile high definition link (MHL) interface, a SD card/multi-media card (MNIC) interface, or an infrared data association (IrDA) standard interface.

The audio module 1180 may convert a sound and an electrical signal in dual directions. At least a part of the audio module 1180 may be included, for example, in the input/output interface 1050 illustrated in FIG. 10. The audio module 1180 may process, for example, sound information that is input or output through a speaker 1182, a receiver 1184, an earphone 1186, or a microphone 1188.

The camera module 1191 for shooting a still image or a video may include, for example, at least one image sensor (e.g., a front sensor or a rear sensor), a lens, an image signal processor (ISP), or a flash (e.g., an LED or a xenon lamp).

The power management module 1195 may manage, for example, power of the electronic device 1101. According to an embodiment, a power management integrated circuit (PMIC) a charger IC, or a battery or fuel gauge may be included in the power management module 1195. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1196 and a voltage, current or temperature thereof while the battery is charged. The battery 1196 may include, for example, a rechargeable battery or a solar battery.

The indicator 1197 may display a specific state of the electronic device 1101 or a part thereof (e.g., the processor 1110), such as a booting state, a message state, a charging state, and the like. The motor 1198 may convert an electrical signal into a mechanical vibration and may generate a vibration effect, a haptic effect, or the like. Even though not illustrated, a processing device (e.g., a GPU) for supporting a mobile TV may be included in the electronic device 1101. The processing device for supporting a mobile TV may process media data according to the standards of digital multimedia broadcasting (DMB), digital video broadcasting (DVB), MediaFlo™, or the like.

Each of the above-mentioned elements may be configured with one or more components, and the names of the elements may be changed according to the type of the electronic device. The electronic device according to various embodiments may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 12:
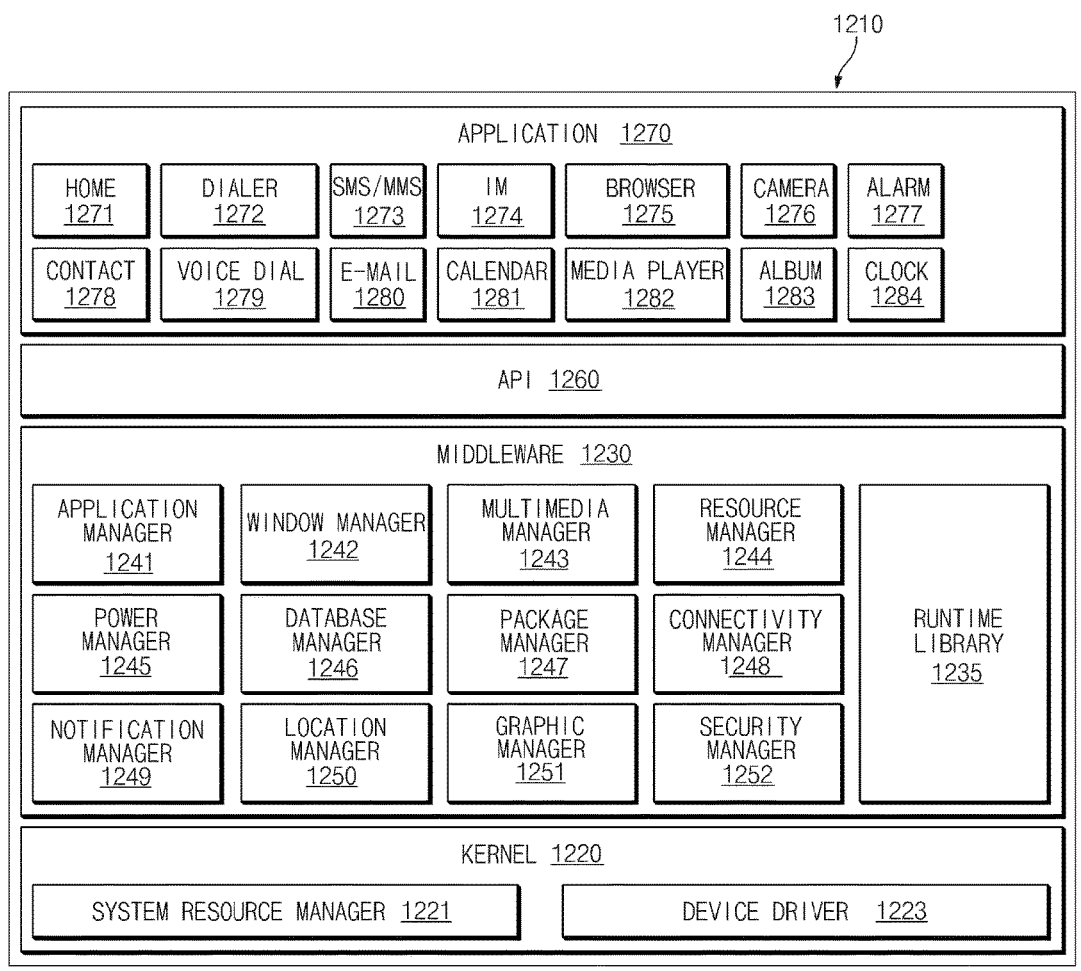
FIG. 12 is a block diagram of a program module according to various embodiments of the present disclosure.

FIG. 12 is a block diagram of a program module according to various embodiments of the present disclosure. According to an embodiment, a program module 1211 (e.g., the program 1040) may include an operating system (OS) to control resources associated with an electronic device (e.g., the electronic device 1001) and/or diverse applications (e.g., the application program 1047) driven on the OS. The OS may be, for example, android, iOS, windows, symbian, tizen, or bada.

The program module 1211 may include a kernel 1220, a middleware 1230, an application programming interface (API) 1260, and/or an application 1270. At least a part of the program module 1211 may be preloaded on an electronic device or may be downloadable from an external electronic device (e.g., the external device 1002, and the like).

The kernel 1220 (e.g., the kernel 1041) may include, for example, a system resource manager 1221 and/or a device driver 1223. The system resource manager 1221 may perform control, allocation, or retrieval of system resources. According to an embodiment, the system resource manager 1221 may include a process managing part, a memory managing part, or a file system managing part. The device driver 1223 may include, for example, a display driver, a camera driver, a Bluetooth driver, a shared memory driver, an USB driver, a keypad driver, a Wi-Fi driver, an audio driver, or an inter-process communication (IPC) driver.

The middleware 1230 may provide, for example, a function which the application 1270 needs in common, or may provide diverse functions to the application 1270 through the API 1260 to allow the application 1270 to efficiently use limited system resources of the electronic device. According to an embodiment, the middleware 1230 (e.g., the middleware 1043) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, or a security manager 1252.

The runtime library 1235 may include, for example, a library module which is used by a compiler to add a new function through a programming language while the application 1270 is being executed. The runtime library 1235 may perform input/output management, memory management, or capacities about arithmetic functions.

The application manager 1241 may manage, for example, a life cycle of at least one application of the application 1270. The window manager 1242 may manage a GUI resource which is used in a screen. The multimedia manager 1243 may identify a format necessary for playing diverse media files and may perform encoding or decoding of media files by using a codec suitable for the format. The resource manager 1244 may manage resources such as a storage space, memory, or source code of at least one application of the application 1270.

The power manager 1245 may operate, for example, with a basic input/output system (BIOS) to manage a battery or power and may provide power information for an operation of an electronic device. The database manager 1246 may generate, search for, or modify database which is to be used in at least one application of the application 1270. The package manager 1247 may install or update an application which is distributed in the form of a package file.

The connectivity manager 1248 may manage, for example, wireless connection such as Wi-Fi or Bluetooth. The notification manager 1249 may display or notify an event such as arrival message, appointment, or proximity notification in a mode that does not disturb a user. The location manager 1250 may manage location information of an electronic device. The graphic manager 1251 may manage a graphic effect that is provided to a user or manage a user interface relevant thereto. The security manager 1252 may provide a general security function necessary for system security or user authentication. According to an embodiment, in the case where an electronic device (e.g., the electronic device 1001) includes a telephony function, the middleware 1230 may further includes a telephony manager for managing a voice or video call function of the electronic device.

The middleware 1230 may include a middleware module that combines diverse functions of the above-described elements. The middleware 1230 may provide a module specialized to each OS kind to provide differentiated functions. Additionally, the middleware 1230 may remove a part of the preexisting elements, dynamically, or may add a new element thereto.

The API 1260 (e.g., the API 1045) may be, for example, a set of programming functions and may be provided with a configuration which is variable depending on an OS. For example, in the case where an OS is the android or the iOS, it may be permissible to provide one API set per platform. In the case where an OS is the tizen, it may be permissible to provide two or more API sets per platform.

The application 1270 (e.g., the application program 1047) may include, for example, one or more applications capable of providing functions for a home 1271, a dialer 1272, an SMS/MMS 1273, an instant message (IM) 1274, a browser 1275, a camera 1276, an alarm 1277, a contact 1278, a voice dial 1279, an e-mail 1280, a calendar 1281, a media player 1282, an album 1283, and a clock 1284, or for offering health care (e.g., measuring an exercise quantity or blood sugar) or environment information (e.g., atmospheric pressure, humidity, or temperature).

According to an embodiment, the application 1270 may include an application (hereinafter referred to as "information exchanging application" for descriptive convenience) to support information exchange between the electronic device (e.g., the electronic device 1001) and an external electronic device (e.g., the external electronic device 1002 or 1004). The information exchanging application may include, for example, a notification relay application for transmitting specific information to the external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the external electronic device 1002 or 1004). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of an external electronic device (e.g., the external electronic device 1002) which communicates with the electronic device, an application running in the external electronic device, or a service (e.g., a call service, a message service, or the like) provided from the external electronic device.

According to an embodiment, the application 1270 may include an application (e.g., a health care application of a mobile medical device, and the like) which is assigned in accordance with an attribute of the external electronic device (e.g., the external electronic device 1002). According to an embodiment, the application 1270 may include an application which is received from an external electronic device (e.g., the external electronic device 1002). According to an embodiment, the application 1270 may include a preloaded application or a third party application which is downloadable from a server. The element titles of the program module 1210 according to the embodiment may be modifiable depending on kinds of OSs.

According to various embodiments, at least a part of the program module 1210 may be implemented by software, firmware, hardware, or a combination of two or more thereof. At least a portion of the program module 1210 may be implemented (e.g., executed), for example, by the processor (e.g., the processor 1020). At least a portion of the program module 1210 may include, for example, a module, a program, a routine, sets of instructions, or a process for performing one or more functions.

The term "module" used in this disclosure may represent, for example, a unit including one or more combinations of hardware, software and firmware. For example, the term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1020), may cause the one or more processors to perform a function corresponding to the instruction. The computer-readable storage media, for example, may be the memory 1030.

The computer-readable storage media according to various embodiments may store a program for executing an operation in which a communication module receives an application package from an external device and provides the application package to a normal module of a processor, an operation in which the normal module determines whether a secure application is included in at least a portion of the application package, and an operation in which the secure module of the processor installs the secure application in the secure module or in a memory associated with the secure module.

The computer-readable storage media may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware devices may be configured to operate as one or more software modules to perform operations according to various embodiments, and vice versa.

Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. Also, a part of operations may be executed in different sequences, omitted, or other operations may be added.

A method for managing operating system according to various embodiments of the present invention may output one unified app execution list at an electronic device capable of driving a plurality of operating systems by using a hypervisor.

The method for managing operating system according to various embodiments of the present invention may verify a driving status of an operating system and may execute an additional function, through the unified app execution list.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

What is claimed is:

1. A method executed by an electronic device including a host operating system and a guest operating system, the method comprising:
   obtaining, by a guest module of the guest operating system, information regarding a guest app executable on the guest operating system;
   providing, by the guest module, the information regarding the guest app to a host module of the host operating system;
   providing, by the host module, the information regarding the guest app to an app list creation module of the host operating system;
   combining, by the app list creation module, information regarding a host app executable on the host operating system and the information regarding the guest app; and
   outputting, by the app list creation module, an app execution list that includes the combined information in time order,
   wherein the information regarding the guest app comprises execution information and app termination information of the guest app,
   wherein the app execution list includes a first icon indicating kind of the guest app,
   wherein the first icon is changed in response to at least one of the execution information and the app termination information,
   wherein the app execution list includes a second icon of the guest operating system and a representative image of the guest app, and
   wherein the second icon is changed according to a booting status of the guest operating system.

2. The method of claim 1, wherein the guest operating system operates in a virtual environment supported by a hypervisor installed on a kernel of the host operating system.

3. The method of claim 1, wherein the information regarding the guest app comprises at least one of an app name, a screen shot, execution time information, app window information, sound output information, or hardware usage information.

4. The method of claim 1, wherein the information regarding the host app is arranged in a first area of the app execution list and the information regarding the guest app is arranged in a second area of the app execution list.

5. The method of claim 1, wherein the app execution list is separated into a main area and a sub area, and the method further comprises:
   outputting the information regarding the host app in the main area when the host operating system is a foreground operating system; and
   outputting the information regarding the guest app in the sub area when the host operating system is the foreground operating system.

6. The method of claim 1, wherein providing the information regarding the guest app comprises:
   storing the information regarding the guest app in a shared memory accessibly by the guest module and the host module.

7. The method of claim 1, wherein providing the information regarding the guest app comprises:
   providing the information regarding the guest app via a virtual serial driver of a hypervisor.

8. The method of claim 1, further comprising:
   receiving a user input associated with the app execution list.

9. The method of claim 8, wherein the user input comprises at least one of a touch input, a gesture input or a voice input.

10. The method of claim 8, further comprising:
    interrupting a process of an app corresponding to the user input.

11. The method of claim 8, further comprising:
    displaying a list for functions operable on an app corresponding to the user input.

12. A method executed on an electronic device including a first operating system and a second operating system, the method comprising:

obtaining, by the second operating system, information regarding a first app executable on the second operating system;

providing, by the second operating system, the information to the first operating system;

combining, by the first operating system, the information from the second operation system and information regarding a second app executable on the first operating system; and outputting, by the first operation system, an app execution list that includes the combined information in time order, wherein the information regarding the first app comprises execution information and app termination information of the first app, wherein the app execution list includes a first icon indicating kind of the first app, wherein the first icon is changed in response to at least one of the execution information and the app termination information, wherein the app execution list includes a second icon of the second operating system and a representative image of the first app, and wherein the second icon is changed according to a booting status of the second operating system.

13. The method of claim 12, wherein the second operating system operates in a virtual environment supported by a hypervisor installed on a kernel of the first operating system.

14. The method of claim 12, wherein the first and second operating systems operate in a virtual environment supported by a hypervisor.

15. An electronic device comprising:
a processor driving a host operating system and a guest operating system,
wherein:
the host operating system including a host module and an app list creation module,
the guest operating system including a guest module,
the guest module obtains information regarding a guest app executable on the guest operating system and provides the information regarding the guest app to the host module,
the host module provides the information regarding the guest app to the app list creation module, and
the app list creation module combines information regarding a host app executable on the host operating system and the information regarding the guest app and outputs an app execution list that includes the combined information in time order,
wherein the information regarding the guest app comprises execution information and app termination information of the guest app, wherein the app execution list includes an icon indicating kind of the guest app, wherein the icon is changed in response to at least one of the execution information and the app termination information, wherein the app execution list includes a second icon of the guest operating system and a representative image of the guest app, and wherein the second icon is changed according to a booting status of the guest operating system.

16. The electronic device of claim 15, wherein the guest operating system operates in a virtual environment supported by a hypervisor installed on a kernel of the host operating system.

17. The electronic device of claim 15, further comprising:
a shared memory accessible by the guest module and the host module.

18. A non-transitory computer-readable recording storage medium having recorded thereon a program for executing a method comprising:
obtaining, by a guest module driven of a guest operating system, information regarding a guest app executable on the guest operating system;
providing, by the guest module, the information regarding the guest app to a host module of a host operating system;
providing, by the host module, the information regarding the guest app to an app list creation module of the host operating system;
combining, by the app list creation module, information regarding a host app executable on the host operating system and the information regarding the guest app; and
outputting, by the app list creation module, an app execution list that includes the combined information in time order,
wherein the information regarding the guest app comprises execution information and app termination information of the guest app,
wherein the app execution list includes an icon indicating kind of the guest app,
wherein the icon is changed in response to at least one of the execution information and the app termination information,
wherein the app execution list includes a second icon of the guest operating system and a representative image of the guest app, and
wherein the second icon is changed according to a booting status of the guest operating system.

* * * * *